United States Patent
Hartsuiker et al.

(10) Patent No.: US 8,168,267 B2
(45) Date of Patent: May 1, 2012

(54) METHOD FOR MANUFACTURING A PREFORM FOR OPTICAL FIBRES BY MEANS OF A VAPOUR DEPOSITION PROCESS

(75) Inventors: Johannes Antoon Hartsuiker, Amsterdam (NL); Igor Milicevic, Helmond (NL); Mattheus Jacobus Nicolaas Van Stralen, Tilburg (NL); Rob Hubertus Matheus Deckers, Eindhoven (NL); Marco Korsten, Eindhoven (NL)

(73) Assignee: Draka Comteq B.V. (NL)

( * ) Notice: Subject to any disclaimer, the term of this patent is extended or adjusted under 35 U.S.C. 154(b) by 948 days.

(21) Appl. No.: 12/147,535

(22) Filed: Jun. 27, 2008

(65) Prior Publication Data
US 2009/0004404 A1   Jan. 1, 2009

(30) Foreign Application Priority Data
Jun. 29, 2007 (NL) ...................................... 1034059

(51) Int. Cl.
*B05D 5/06* (2006.01)
*C03B 37/023* (2006.01)
(52) U.S. Cl. ........ 427/569; 427/576; 427/165; 427/166; 427/237; 427/309; 427/337; 65/385; 65/391; 65/413; 65/417
(58) Field of Classification Search .................. 427/569, 427/165, 166, 235, 237, 576, 309, 337; 65/385, 65/391, 413, 417
See application file for complete search history.

(56) References Cited

U.S. PATENT DOCUMENTS

| | | | |
|---|---|---|---|
| 4,493,721 A | | 1/1985 | Auwerda et al. |
| 4,630,890 A * | | 12/1986 | Ashkin et al. ................. 385/123 |
| 6,105,396 A * | | 8/2000 | Glodis et al. .................... 65/377 |
| 6,821,449 B2 * | | 11/2004 | Caplen et al. .................... 216/24 |
| 6,892,019 B2 * | | 5/2005 | Nagayama et al. ........... 385/127 |
| 7,891,217 B2 * | | 2/2011 | Nakanishi et al. .............. 65/418 |
| 8,020,410 B2 * | | 9/2011 | Bookbinder et al. .......... 65/379 |
| 2002/0136515 A1 * | | 9/2002 | Schaper et al. ................ 385/123 |
| 2002/0157426 A1 * | | 10/2002 | Mazzarese et al. ............. 65/428 |
| 2002/0174689 A1 * | | 11/2002 | Onishi et al. .................... 65/378 |
| 2004/0031289 A1 * | | 2/2004 | Neuberger et al. ............. 65/391 |
| 2004/0107734 A1 * | | 6/2004 | Kenkare et al. ................. 65/378 |
| 2005/0103057 A1 * | | 5/2005 | Kang et al. ...................... 65/391 |
| 2005/0172902 A1 * | | 8/2005 | Van Stralen et al. .. 118/723 MW |
| 2006/0230793 A1 * | | 10/2006 | Hong et al. ..................... 65/417 |

FOREIGN PATENT DOCUMENTS
EP    1783104    *   6/2011

(Continued)

OTHER PUBLICATIONS

Matejec, Vlastimil, et al., "Properties of Optical Fiber Preforms Prepared by Inner Coating of Substrate Tubes". Ceramics—Silikaty 45 (2) pp. 62-69 (2001).*

(Continued)

*Primary Examiner* — Bret Chen
(74) *Attorney, Agent, or Firm* — Shumaker, Loop & Kendrick, LLP

(57) ABSTRACT

A method for manufacturing a preform for optical fibers by a vapor deposition process wherein an intermediate step is carried out between one deposition phase and the next deposition phase(s), wherein the intermediate step includes supplying an etching gas to the supply side of the hollow substrate tube.

15 Claims, 1 Drawing Sheet

FOREIGN PATENT DOCUMENTS

FI        8902419 A     3/1989
WO     89/02419       3/1989

OTHER PUBLICATIONS

Cognolato, L., "Chemical Vapour Deposition for Optical Fibre Technology". Journal de Physique IV, Colloque C5, supplement au Journal de Physique II, vol. 5, Jun. 1995, pp. C5-975 to C5-987.*

Zhang, Aidong, et al., "Multistage etching process for microscopically smooth tellurite glass surfaces in optical fibers". J. Vac. Sci. Technol. B 28(4), Jul./Aug. 2010, pp. 682-686.*

Ebendorff-Heidepriem, et al., "Extrusion of complex preforms for microstructured optical fibers". Optics Express 15086, vol. 15, No. 23, Nov. 12, 2007, pp. 1-7.*

* cited by examiner

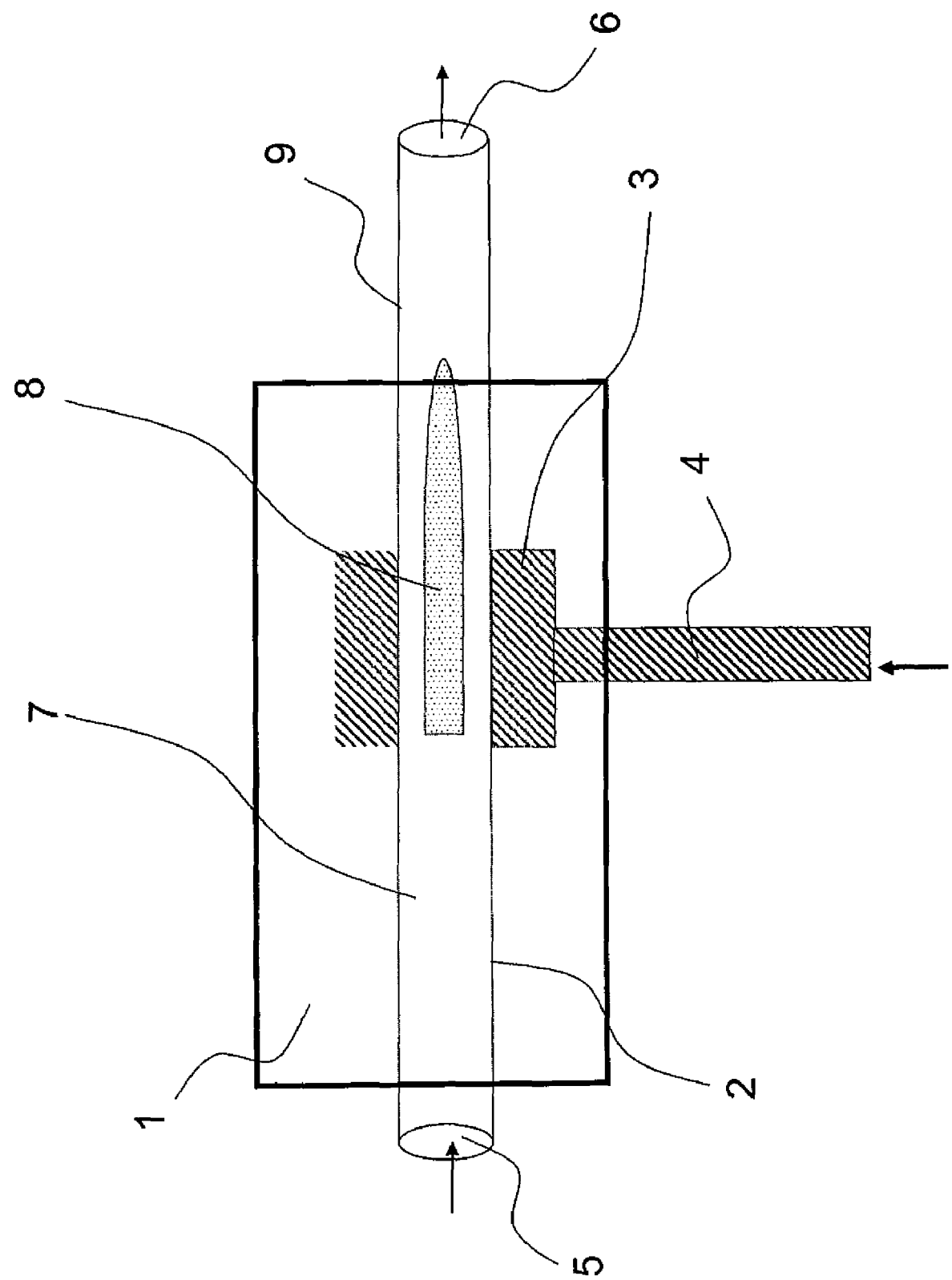

METHOD FOR MANUFACTURING A PREFORM FOR OPTICAL FIBRES BY MEANS OF A VAPOUR DEPOSITION PROCESS

CROSS-REFERENCE TO RELATED APPLICATION

This application claims priority to Netherlands Patent Application No. 1034059 filed Jun. 29, 2007, the contents of which are incorporated by reference herein.

TECHNICAL FIELD AND BACKGROUND OF THE INVENTION

The present invention relates to a method for manufacturing a preform for optical fibres by means of a vapour deposition process.

A device for manufacturing a preform for optical fibres by means of a vapour deposition process is known per se from Korean patent application No. 2003-774,952. Using the device that is known therefrom, an optical preform is made by means of an MCVD (Modified Chemical Vapour Deposition) process, in which a discharge tube and an insert tube are used, which discharge tube is attached to the substrate tube. The insert tube is disposed within the discharge tube and has an external diameter which is smaller than that of the discharge tube. Disposed within the insert tube is a soot scraping element, which comprises a bar which rotates in the interior of the insert tube and which is in contact with the inner surface thereof. Between the insert tube and the discharge tube is an annular space, through which gases are passed.

From International application WO 89/02419 there is known a device for manufacturing an optical preform by means of an internal vapour deposition process, wherein a tubular element is mounted at the pump side of a substrate for the removal of solid, undeposited particles. In particular, such a device comprises a screw structure which follows the inner surface of the tubular element, which screw structure comprises an open gas conduit which is spiral-shaped and rotatable.

During the deposition of doped or undoped glass layers on the interior of a substrate tube, in particular by means of the PCVD (Plasma Chemical Vapour Deposition) process, low-quality quartz layers may be deposited, in particular in the area outside the range of movement of the energy source being reciprocated along the length of the substrate tube, viz. the resonator. Examples of such a low-quality quartz layers are so-called soot rings, but also but also quartz having a high internal stress caused by a high dopant content.

The present inventors have found that such low quality quartz present in the interior of the substrate tube may adversely affect the substrate tube, in particular as a result of the formation of gas bubbles in the vicinity of the supply side of the substrate tube upon collapsing the hollow substrate tube into a solid preform. In addition to that, the present inventors have found that such low quality quartz may come loose from the interior of the hollow substrate tube during the collapsing process, which may lead to contamination or to the formation of gas bubbles elsewhere in the substrate tube. Another negative aspect is the fact that cracks may occur in the low quality quartz region, which cracks may propagate in the direction of the center of the substrate tube, which is undesirable.

The present inventors have furthermore found that the low quality quartz may lead to clogging of the substrate tube and the associated piping, as a result of which the pressure may increase to an undesirably high value during the deposition process, which will have an adverse effect the deposition process in the substrate tube, which effect will be perceived as a white color in practice.

The substrate tube itself is made of high-quality quartz. In practice, however, the total length of the substrate tube will be greater than the length of the part of the substrate tube that is eventually converted into a glass fibre by means of a drawing process, because the two ends of the substrate tube, where deposition takes place, may cause undesirable side effects, viz. deposition defects, contamination, formation of bubbles and the like.

The present inventors have in particular found that, in the situation in which a so-called insert tube is used on the discharge side of the hollow substrate tube, the deposition of soot in particular occurs at high deposition rates, notably deposition processes in which the deposition of glass layers takes place at a rate of more than 3 g/minute, which processes generally last longer than 5 hours. Such an insert tube has an external diameter which is smaller than the internal diameter of the hollow substrate tube itself, and generally it is disposed within the substrate tube with a close fit, near the discharge side thereof. As a result of the buildup of soot in the insert tube, the pressure within the hollow substrate tube will increase, so that the deposition efficiency of $SiCl_4$ will decrease further and (even) more soot will be formed, which is undesirable. Such a process is self-reinforcing, which means that the deposition process will have to be terminated due to a complete blockage of the passage of the insert tube on the discharge side of the hollow substrate tube. The interruption of the deposition process is considered to be undesirable.

SUMMARY OF THE INVENTION

One object of the present invention is thus to provide a method for manufacturing a preform for optical fibres in which the risk of clogging of the insert tube near the discharge side of the hollow substrate tube is minimized.

Another object of the present invention is to provide a method for manufacturing a preform for optical fibres in which the deposition process does not have to be terminated unnecessarily due to clogging in spite of the fact that high deposition rates and long process times are used.

In one embodiment, the method of the present invention comprises the steps of:

i) providing a hollow glass quartz substrate tube having a supply side and a discharge side;

ii) supplying doped or undoped glass-forming gases to the interior of the hollow substrate tube via the supply side thereof, iii) creating temperature and plasma conditions in the interior of the hollow substrate tube for depositing glass layers on the inner surface of the hollow substrate tube, which deposition can be regarded as comprising a number of separate phases, each phase having an initial refractive index value and a final refractive index value and comprising the deposition of a number of glass layers on the inside of the hollow substrate tube during a certain time period, the plasma being moved back and forth along the longitudinal axis of the hollow substrate tube between a reversal point near the supply side and a reversal point near the discharge side of the hollow substrate tube; and possibly iv) consolidating the substrate tube obtained after step iii) into the preform.

BRIEF DESCRIPTION OF THE FIGURES

FIG. 1 is a schematic diagram of a substrate tube and other equipment used in practicing the methods of the present invention.

DETAILED DESCRIPTION OF THE INVENTION

In one embodiment, the method of the present invention comprises the steps of:
i) providing a hollow glass quartz substrate tube having a supply side and a discharge side;
ii) supplying doped or undoped glass-forming gases to the interior of the hollow substrate tube via the supply side thereof;
iii) creating temperature and plasma conditions in the interior of the hollow substrate tube for depositing glass layers on the inner surface of the hollow substrate tube, which deposition can be regarded as comprising a number of separate phases, each phase having an initial refractive index value and a final refractive index value and comprising the deposition of a number of glass layers on the inside of the hollow substrate tube during a certain time period, the plasma being moved back and forth along the longitudinal axis of the hollow substrate tube between a reversal point near the supply side and a reversal point near the discharge side of the hollow substrate tube; and possibly
iv) consolidating the substrate tube obtained after step iii) into the preform.

According to the method for manufacturing such a preform rod as referred to above, the cylindrical inner surface of an elongated, vitreous substrate tube (for example made of quartz) is coated with layers of doped or undoped silica (for example germanium-doped silica). The term "silica" as used herein is to be understood to mean any substance in the form of $SiO_x$, whether or not stoichiometric, and whether or not crystalline or amorphous. This can be effected by positioning the substrate tube along the cylindrical axis of the resonance cavity, and flushing the interior of the tube with a gaseous mixture comprising $O_2$, $SiSl_4$ and $GeCl_2$ (for example). A localized plasma is concurrently generated within the cavity, causing the reaction of Si, O and Ge so as to thus effect direct deposition of, for example, Ge-doped $Si_x$ on the inner surface of the substrate tube. Since such deposition only occurs in the vicinity of the localized plasma, the resonant cavity (and thus the plasma) must be swept along the cylindrical axis of the tube in order to uniformly coat the tube along the entire length thereof.

When coating is complete, the tube is thermally collapsed into a massive rod having a Ge-doped silica core portion and a surrounding undoped silica cladding portion. If an extremity of the rod is heated so that it becomes molten, a thin glass fibre can be drawn from the rod and be wound on a reel; the fibre then has a core portion and a cladding portion corresponding to those of the rod. Because the Ge-doped core has a higher refractive index than the undoped cladding, the fibre can function as a waveguide, for example for use in propagating optical telecommunication signals. It should be noted that the gaseous mixture flushed through the substrate tube may also contain other components; the addition of $C_2F_6$, for example, leads to a reduction in the refractive index value of the doped silica. It should also be noted that the preform rod may be externally coated with an additional glass layer, for example by applying silica by means of a deposition process, or by placing the preform rod in a so-called jacket tube (comprised of undoped silica) prior to the drawing procedure, so as to thus increase the amount of undoped silica relative to the amount of doped silica in the final fibre.

The use of such an optical fibre for telecommunication purposes requires that the optical fibre be substantially free from defects (for example discrepancies in the percentage of dopants, undesirable cross-sectional ellipticity and the like), because, when considered over a large length of the optical fibre, such defects may cause a significant attenuation of the signal being transported. It is important, therefore, to realize a very uniform and reproducible PCVD process, because the quality of the deposited PCVD layers will eventually determine the quality of the fibres.

The present invention is characterized in that the deposition of glass layers on the inner surface of the hollow substrate tube is interrupted during step iii) by carrying out at least one intermediate step, wherein the intermediate step comprises supplying an etching gas to the supply side of the hollow substrate tube, while the supply of the doped or undoped glass-forming gases is stopped during the intermediate step, and the possible continuation of the deposition process after termination of the intermediate step.

One or more of the above objects are accomplished by implementing such an aspect. The present inventors have found that the initial position and the exact distribution of the deposition of glass layers on the interior of the hollow substrate tube depends on a number of process conditions, such as the plasma power that is used, the pressure inside the hollow substrate tube, the configuration of the resonator and the deposition rate. The present inventors have thus found that a small fraction of the glass layers is deposited on the interior of the insert tube near the discharge side of the hollow substrate tube during the PCVD process. As a result of the low temperature that prevails in the insert tube in comparison with the temperature that prevails in the hollow substrate tube itself, a certain amount of soot is deposited at that location instead of quartz. The thus deposited material, viz. soot, has a much higher specific volume than quartz, so that even a small amount of soot may lead to clogging of the insert tube. In addition, such soot material may come loose from the interior of the hollow substrate tube and lead to contaminations elsewhere in the substrate tube.

By interrupting the deposition step iii) temporarily, preferably between one deposition phase and the next deposition phase(s), during which interruption an intermediate step is carried out, which intermediate step comprises the supplying of an etching gas to the interior of the hollow substrate tube via the supply side, the previously deposited soot layer is removed from the interior of the insert tube and/or the substrate tube. In order to be able to carry out the intermediate step in an effective manner, it is desirable that plasma conditions prevail in the interior of the insert tube and/or the substrate tube during the intermediate step, which is effected in particular by having the plasma move back and forth along the longitudinal axis of the hollow substrate tube between the point of the reversal near the supply side and the point of reversal near the discharge side of the hollow substrate tube.

A deposition phase comprises the supplying of glass-forming components in a carrier gas, such as $SiCl_4$, $GeCl_4$) $C_2F_2$ and $O_2$, on the supply side of the hollow substrate tube. In the intermediate step, only a halogen-containing gas is supplied to the interior of the hollow substrate tube via the supply side thereof, which etching gas may be provided with a carrier gas or flushing gas, such as oxygen. The intermediate step is in fact terminated by resuming the supply of the glass-forming gases to the interior of the hollow substrate tube, possibly in combination with dopants that change (increase, decrease) the refractive index. Thus, an alternation of deposition phases and intermediate step(s) may take place in a special embodiment of the present application.

For a so-called step index perform it is possible to carry out the intermediate step within a deposition phase itself, while for a so-called gradient index preform an interruption within a deposition phase itself is considered to be disadvantageous, because it leads to an undesirable profile disturbance. Thus it is preferable in the case of a gradient index preform to carry out the intermediate step according to the present invention between one deposition phase and the next deposition phase (s), which deposition phases may lead to different glass compositions, possibly resulting in different refractive index values. Thus it has been found that the soot present in the insert tube is effectively etched away when such an intermediate step is used, so that any clogging of the insert tube is prevented. After such an intermediate step, in which an etching operation is carried out, the deposition of glass layers is resumed. It is preferable, therefore, to carry out the aforesaid intermediate step each time between two deposition phases.

The etching gas used in the present invention is preferably a halogen-containing gas, in particular of fluorine-containing gas, in particular selected from the group consisting of $CCl_2F_2$, $CF_4$, $C_2F_6$, $SF_6$, $F_2$ and $SO_2F_2$, or a combination thereof, in which case the fluorine-containing gas may be present in a flushing gas. In particular $C_2F_6$ and $SF_6$ are preferred etching gases.

In a special embodiment, the intermediate step is preferably carried out for a period of 5-15 minutes, while it is particularly preferable if the substrate tube is rotated during said intermediate step.

Although the plasma moves back and forth along the longitudinal axis of the hollow substrate tube, between the point of reversal near the supply side and the point of reversal near the discharge side of the hollow substrate tube, during step iii), it is possible in a special embodiment for the plasma to be present near the point of reversal near the discharge side of the hollow substrate tube during the intermediate step. In such an embodiment, the intermediate step is in particular carried out at a position where the deposition of soot is predominant, viz. near the discharge side of the hollow substrate tube, in particular in the insert tube that is disposed on the aforesaid side. In such an embodiment the plasma power that is used may be set to a value of maximally 10 kW, in particular to a value of maximally 5 kW, so that in particular melting of the substrate tube and/or the insert tube is prevented.

The present invention is in particular suitable for manufacturing preforms from which single-mode optical fibres are obtained, but the present invention may also be suitably used for removing layers having a high germanium content from the entire interior of the preform after termination of step iii), which layers are responsible for the occurrence of layer cracking when the hollow substrate tube is subjected to a consolidation treatment for manufacturing the solid preform. The risk of layer cracking is prevented by thus removing layers having a high germanium content.

The present invention will be explained hereinafter by means of an example, in which connection it should be noted, however, that the present invention is by no means limited to such special examples. The FIGURE is a schematic representation of the equipment used in the deposition process.

Example

Referring to FIG. 1, a hollow substrate tube 2 made of quartz was manufactured by means of a standard PCVD process as known from Dutch patent NL 1 023 438 in the name of the present applicant. The hollow substrate tube 2 having a supply side 5 and a discharge side 6 was placed in a furnace 1, in which furnace 1 a resonator 3 is present, which resonator 3 can move back and forth along the length of the hollow substrate tube 2 within the furnace 1. Microwave energy was supplied to the resonator 3 via the waveguide 4 so as to create plasma conditions in the interior 7 of the hollow substrate tube 2, which plasma conditions function to deposit glass layers on the interior 7 of the hollow substrate tube 2. Disposed within the hollow substrate tube 2, near the discharge side 6 of the hollow substrate tube 2, is a so-called insert tube (not shown), in which insert tube deposition of soot takes place near the location indicated at 9. Such an insert tube has an external diameter which is smaller than the internal diameter of the hollow substrate tube 2 itself, and generally it is disposed within the substrate tube 2 with a close fit, near the discharge side 6 thereof. The present inventors have found that the plasma generated by the resonator 3 may be present slightly outside the resonator 3, in which case the plasma in particular exits the resonator 3 in the vicinity of the discharge side 6, near the insert tube. As a result of the aforesaid deposition of soot, the effective cross-sectional area in the insert tube was reduced, resulting in a pressure increase inside the hollow substrate tube 2, which adversely affected the deposition process. Such soot rings were visually perceptible during the deposition process. The present application is in particular aimed at removing such soot deposition at any desired moment, in particular during the deposition process.

An internal chemical vapour deposition process was carried out by moving the plasma back and forth along the length of a hollow substrate tube 2 at a velocity of 20 m/min, which hollow substrate tube 2 was positioned in the interior of a furnace 1. The furnace 1 was set to a temperature of 1000° C., using a plasma power of 9 kW. The deposition rate of glass layers on the interior of the thus positioned hollow substrate tube 2 was 3.1 g/min, based on $SiO_2$, with the pressure inside the hollow substrate tube 2 amounting to about 10 mbar. A gas composition consisting of $O_2$, $SiCl_4$, $GeCl_4$ and $C_2F_6$ was supplied to the interior 7 of the hollow substrate tube 2.

After a period of about 50 minutes, the deposition of glass layers on the interior 7 of the hollow substrate tube 2 was interrupted and subsequently the resonator 3, in particular the element in which a plasma is generated, was moved in the direction of the discharge side 6 of the hollow substrate tube 2. A distinct contamination with soot was perceptible in the interior of the hollow substrate tube 2, near the discharge side 6 of which an insert tube is disposed. After the resonator 3 had been moved, the intermediate step according to the present invention was carried out, during which intermediate step the temperature of the furnace was maintained at 1000° C. The plasma power was reduced to 5 kW. The composition of the gases supplied to the interior 7 of the hollow substrate tube 2 was changed into an etching gas composition consisting of a fluorine-containing compound and oxygen, in particular with a delivery rate of 3 standard litres of $O_2$ per minute and 0.3 standard litres of $C_2F_6$ per minute. The intermediate step was carried out for 5-10 minutes, during which the hollow substrate tube 2 was continuously rotated. After termination of the intermediate step thus carried out it was established that hardly any soot was left in the insert tube in the vicinity of the discharge side 6. After soot had been removed in the above-described manner, the deposition process was resumed, in particular by supplying a gas composition consisting of $O_2$, $SiCl_4$, $GeCl_4$ and $C_2F_6$ to the interior of the hollow substrate tube 2.

What is claimed is:

1. A method for manufacturing a preform for optical fibres by means of a vapour deposition process, wherein the method comprises the steps of:
   i) providing a hollow glass quartz substrate tube having a supply side and a discharge side;
   ii) supplying doped or undoped glass-forming gases to the interior of the hollow substrate tube via the supply side thereof;
   iii) creating temperature and plasma conditions in the interior of the hollow substrate tube for depositing glass layers on the inner surface of the hollow substrate tube, wherein deposition can be regarded as comprising a number of separate phases, each phase having an initial refractive index value and a final refractive index value and comprising the deposition of a number of glass layers on the inside of the hollow substrate tube during a certain time period, the plasma being moved back and forth along the longitudinal axis of the hollow substrate tube between a reversal point near the supply side and a reversal point near the discharge side of the hollow substrate tube;
   iv) depositing glass layers in a deposition phase having an initial refractive index value and a final refractive index value on the inner surface of the hollow substrate tube;
   v) interrupting the deposition phase by carrying out at least one intermediate step comprising supplying an etching gas to the supply side of the hollow substrate tube while the supply of the doped or undoped glass-forming gases is stopped; and
   vi) depositing glass layers in a next deposition phase having an initial refractive index value and a final refractive index value on the inner surface of the hollow substrate tube after termination of the at least one intermediate step.

2. A method according to claim 1, wherein the intermediate step is carried out between the deposition phase and the next deposition phase.

3. A method according to claim 1, further comprising the step of:
   vii) consolidating the substrate tube obtained after step vi) into a preform.

4. A method according to claim 1, wherein the etching gas is a fluorine-containing etching gas.

5. A method according to claim 1, wherein the etching gas is selected from the group consisting of: $CCl_2F_2$, $CF_4$, $C_2F_6$, $SF_6$, $F_2$ and $SO_2F_2$, or a combination thereof.

6. A method, according to claim 1, wherein the etching gas is supplied in the presence of a flushing gas.

7. A method according to claim 6, wherein the flushing gas is oxygen.

8. A method according to claim 1, wherein the etching gas is a combination of $C_2F_6$ and $O_2$.

9. A method according to claim 1, wherein the intermediate step is carried out for a period of 5-15 minutes.

10. A method according to claim 1, wherein the substrate tube is rotated during the intermediate step.

11. A method according to claim 1, wherein the plasma is present in the vicinity of the point of reversal near the discharge side of the hollow substrate tube during the intermediate step.

12. A method according to claim 1, wherein a plasma power is set to a value of maximally 10 kW.

13. A method according to claim 1, wherein a plasma power is set to a value of maximally 5 kW.

14. A vapour deposition method comprising the steps of:
   providing a hollow glass quartz substrate tube having a supply side and a discharge side;
   supplying doped or undoped glass-forming gases to the interior of the hollow substrate tube via the supply side thereof;
   creating temperature and plasma conditions in the interior of the hollow substrate tube for depositing glass layers on the inner surface of the hollow substrate tube, wherein deposition can be regarded as comprising a number of separate phases, each phase having an initial refractive index value and a final refractive index value and comprising the deposition of a number of glass layers on the inside of the hollow substrate tube during a certain time period, the plasma being moved back and forth along the longitudinal axis of the hollow substrate tube between a reversal point near the supply side and a reversal point near the discharge side of the hollow substrate tube;
   depositing glass layers in a deposition step on the inner surface of the hollow substrate tube;
   interrupting the deposition step by carrying out at least one intermediate step comprising supplying an etching gas to the supply side of the hollow substrate tube while the supply of the doped or undoped glass-forming gases is stopped; and
   depositing glass layers in a next deposition step on the inner surface of the hollow substrate tube after termination of the at least one intermediate step.

15. A method according to claim 14, further comprising the step of:
   consolidating the substrate tube into a preform.

* * * * *